United States Patent [19]

Scholdstrom et al.

[11] 4,227,802
[45] Oct. 14, 1980

[54] APPARATUS FOR MEASURING THE DISTANCE TO A POINT ON THE INNER WALL OF A HOT FURNACE

[75] Inventors: Ragnar Scholdstrom; Holger Marcus; Lennart Nordstrom, all of Lidingo, Sweden

[73] Assignee: AGA Aktiebolag, Sweden

[21] Appl. No.: 788,346

[22] Filed: Apr. 18, 1977

Related U.S. Application Data

[63] Continuation-in-part of Ser. No. 635,081, Nov. 25, 1975, abandoned.

[30] Foreign Application Priority Data

Nov. 20, 1974 [SE] Sweden ............................. 7414531

[51] Int. Cl.³ .................... G01C 3/00; G01B 11/06; G02B 5/22

[52] U.S. Cl. ........................................ 356/5; 350/313; 350/316; 350/166; 356/381
[58] Field of Search ..................... 350/313, 316, 166; 356/4, 5, 28, 141, 152, 381

[56] References Cited

U.S. PATENT DOCUMENTS

| 3,802,775 | 4/1974 | Hughes | 356/4 |
| 3,832,056 | 8/1974 | Shipp et al. | 356/5 |

OTHER PUBLICATIONS

Ramsey et al.; *J. Scientific Instruments*, vol. 42, No. 5, May 1965, pp. 334–336; 350-166.

*Primary Examiner*—Stephen C. Buczinski
*Attorney, Agent, or Firm*—Lerner, David, Littenberg & Samuel

[57] ABSTRACT

Apparatus is disclosed for measuring the distance to a point on the inner wall of a hot furnace.

1 Claim, 2 Drawing Figures

APPARATUS FOR MEASURING THE DISTANCE TO A POINT ON THE INNER WALL OF A HOT FURNACE

This is a continuation-in-part of our copending application Ser. No. 635,081, filed Nov. 25, 1975, now abandoned.

BACKGROUND OF THE INVENTION

In order to resist the high temperatures (up to about 1600° C.) occurring in decarburization furnaces used in the steel industry, these furnaces must be lined with fire resistant material, such as dolomite or magnesite. The linings are initially quite thick, about 0.5 meters, but are worn during the decarburization procedure. Before the lining material is diminished below a certain critical thickness, at which thickness there exists the risk that the supporting steel mantle will be burnt through, the furnace must be shut down for relining. Such a relining is expensive, partly because of the relining costs themselves and partly because the furnace is not functioning for a period of time.

It is therefore apparent that a need exists for a method for measuring the thickness of the lining in order to have it under safe control when the furnace is operating. Such a measuring method should meet with the two following requirements:

(1) Short measuring time and a quick estimation of the results of the measurement, so that steps can be taken for relining, in good time; and (2) Good accuracy of the measurement, which means in practice that the thickness of the lining in question shall be known with an accuracy of about 5 mm. It is also essential to find out the shape of the profile of the lining both in the axial direction and along the circumference inside the furnace. This is because it will then be possible, by controlling the process, to obtain a more even wear of the lining which is evidently of economical advantage.

No method used so far has met with both the above demands. A visual observation, for instance, is quick but gives bad accuracy. By stereophotogrammetry it is possible to measure to an accuracy of perhaps 30–40 mm, but the method is slow, and the result is not obtained until after one or more days. Therefore, this method is not suitable for operation control.

An isotope method is available which operates by analyzing samples of the charge to decide how much has been dissolved of a wire, radially inserted in the lining and having good radioactive properties. The method gives high accuracy, but like the foregoing method, it has a long evaluation time and is more suitable for the calibration of other measuring methods.

A quick and safe method would be to measure the distance from a point outside the furnace to one or more points on the furnace lining. This is quite possible if the furnace is allowed to cool, whereby common measuring methods may be used. However, such a cooling of the furnace is very time-consuming and thereby expensive and the reheating requires much energy.

It is therefore an object of the present invention to provide apparatus by the use of which it is possible to make a dimension measurement which is very accurate and meets with the abovementioned demands. It is another object of the present invention to provide such apparatus which may be placed outside the furnace and allow measurements to one or more points on the furnace lining, while the furnace is hot.

SUMMARY OF THE INVENTION

The foregoing, and additional, objects are attained in accordance with the principles of this invention by utilizing an electro-optical distance measuring instrument from which a modulated narrow band, narrow beam, of laser generated radiation is emitted. The distance measuring instrument transmits the modulated radiation to a point on the wall of the furnace, which beam is reflected back towards the instrument to be measured in the same manner as is achieved with ordinary electro-optical distance measuring equipment. However, because of the problem of the radiation emitted from the hot furnace wall, and, further, the problem created by the fact that the furnace wall is not a perfect reflector, it is necessary to be close to the furnace wall, i.e., within twenty meters, to obtain an accurate reading. An optical filter is provided in association with the electro-optical distance measuring instrument to filter out all radiation except an extremely narrow band surrounding the frequency of the laser radiation from the electro-optical distance measuring instrument. This enables the instrument to get a correct reading without interference from the extraneous radiation being emitted from the furnace wall. The optical filter includes a narrow bandwidth Fabry-Perot filter, which can be temperature compensated, and an interference filter having a wider band than the Fabrey-Perot filter which aids in cutting off extraneous radiation signals, particularly in the side bands of the Fabry-Perot filter and which, although not temperature compensated, has a wide enough band so that the signals within the bandwidth of the Fabry-Perot filter are always transmitted thereto. Accordingly, an accurate measurement can be made of the distance from the electro-optical instrument to the furnace wall.

Although this invention will be described with respect to its preferred embodiment, it should be understood that many variations and modifications will be obvious to those skilled in the art, and it is preferred, therefore, that the scope of the invention be limited, not by the specific disclosure herein but only by the appended claims.

DESCRIPTION OF THE DRAWINGS

The foregoing will be more readily apparent upon reading the following description in conjunction with the drawings wherein.

DESCRIPTION OF THE PREFERRED EMBODIMENT

Figure 1:
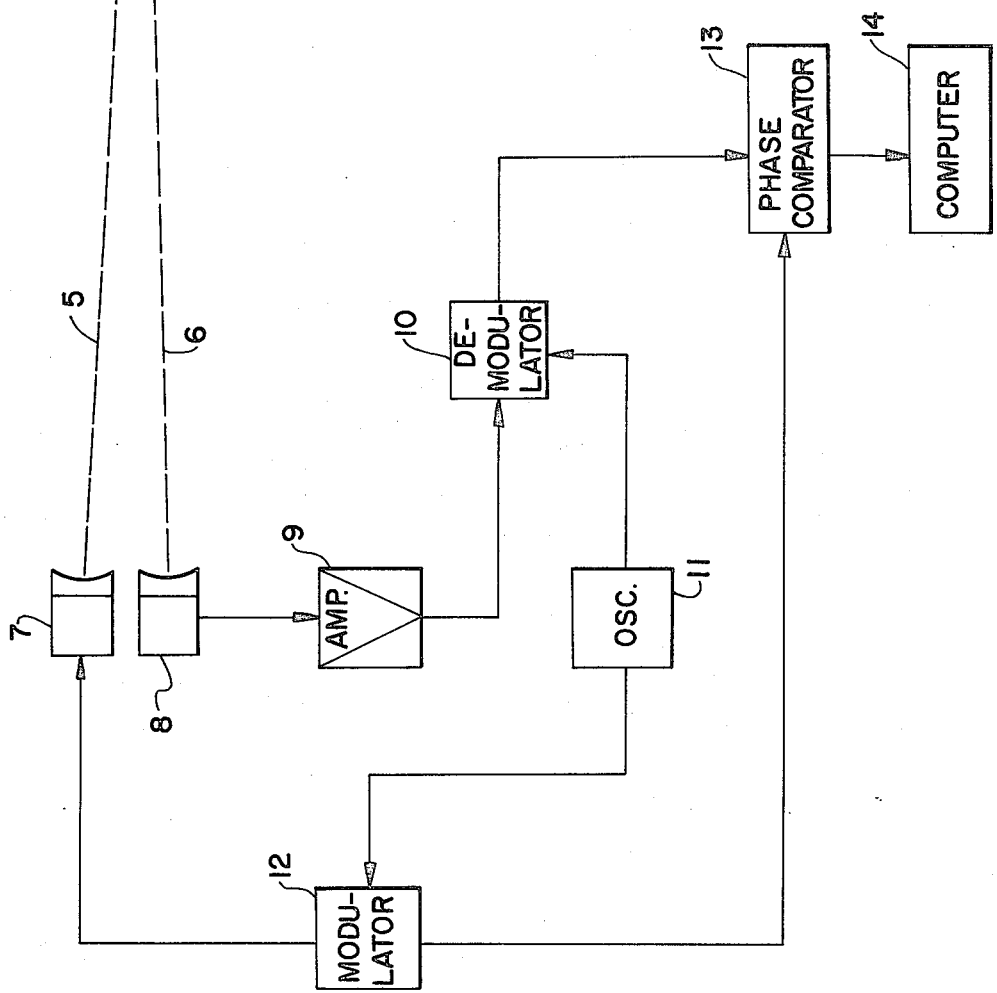
FIG. 1 shows an embodiment of apparatus constructed in accordance with the principles of this invention.

FIG. 1 shows a decarburization furnace 1 in cross-section. The furnace consists of a steel mantle 2 and is provided inside with a lining 3, which may, for instance, consist of dolomite or magnesite. The front surface of the furnace is denoted 15.

A point 4 is shown on the lining 3, to which the distance is measured by means of an electro-optical distance measuring instrument. This instrument emits a beam 5 to point 4 and receives the beam 6 after reflection at the point 4.

The electro-optical distance measuring instrument comprises a transmitting part 7, from which a monchromatically modulated light beam is emitted. The modulation has a suitable frequency which allows for sufficient distance resolution. The radiation source in the transmitter part 7 includes a laser modulated with a low frequency signal by modulator 12, which laser emits radiation of a wave-length which on the one hand differs from the wave-length where the furnace radiation band-width is at a maximum to receive a favorable signal-noise relation, and on the other hand lies within a wave-length area for which photo-detectors are sensitive. The transmitter part 7 also comprises focusing means. After reflection from the point 4 the radiation impinges upon receiver 8, which contains a detecting member.

In the receiver 8 the modulation of the radiation is transformed into an electrical signal which is fed to an amplifier 9. After the amplifier 9 a demodulator 10 is arranged for demodulating the signal received. This demodulation takes place utilizing a signal from oscillator 11. The signal from oscillator 11 has a frequency which generally is rather close to the frequency of the modulation frequency of the signal received and thereby a signal of comparatively low frequency is received after filtering at the output of demodulator 10.

This low-frequency signal at the output of demodulator 10 contains phase information from the signal received and is compared with the transmitted low frequency signal from modulator 12 at phase comparator 13. Therefore a phase measurement can be made on this signal. Since such demodulation of the signal in a distance measuring instrument is known and commonly used, it will not be further described here.

The block designated by reference numeral 14 schematically indicates computer means for using the output data.

Figure 2:
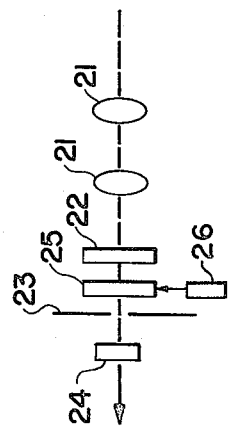
FIG. 2 shows a detail of the apparatus of FIG. 1.

The distance measuring instrument shown as block 7-13 in FIG. 1 consists substantially of an instrument known before, except for the special characteristics of the light emitter itself, which have been mentioned above, and of the receiver, which will be explained in connection with FIG. 2.

The example shown includes demodulation to a lower frequency. However, instruments not having such demodulation can also be used. As an example of such an instrument may be mentioned the one described in U.S. Pat. No. 3,779,645. Also in this case, the emitter and the receiver must, of course, be modified in accordance with the invention. When using the electro-optical distance measuring instruments known on the market, a reflector is always used at the farther end of the measuring path. This reflector usually consists of reflecting tape, a mirror or special reflecting prisms. When measuring into hot furnaces, it is apparent that reflectors cannot be used. Under such circumstances the radiation emitted from the instrument is reflected by the inner surface of the furnace. However, the instruments available on the market cannot clearly enough distinguish between the radiation emitted and the self-radiation from the furnace, in order to achieve great accuracy.

The apparatus according to the invention is so constructed that on one hand the transmitting part meets the requirements set forth above and on the other hand the receiving part is adapted and modified as will now be described in more detail in connection with FIG. 2.

The demands for the transmitting part have been mentioned in connection with FIG. 1. The receiving part of the instrument comprises a lens system 21, behind which a filter 22 is mounted. The filter 22 is adapted to the radiation emitted from the instrument and its bandwidth is as narrow as possible with consideration for the variations which may occur. Further there is a diaphragm 23 in the receiving part which has the purpose of operating so that the detector 24 located behind the diaphragm 23 is hit substantially by the returning radiation from the instrument. In other words, the diaphragm 23 prevents as much as possible the self-radiation of the furnace from hitting the detector.

The filter 22 may, for instance, have a bandwidth of about 2 1 nm and be a so-called interference filter, where the filter effect is achieved by letting the incident radiation pass a number of transparent layers having alternatingly high and low refractive indices. The thickness of the layers is a function of the central wave-length desired and the bandwidth. Since interference filters of standard type are sensitive to temperature variations it is, for practical reasons, not possible to use such filters with bandwidths of less than approximately 20 Å (i.e. 2 nm). However, a filter of this kind does not suppress the background radiation to a sufficient extent to allow measurements to the inner wall of a hot furnace, if the temperature of the wall exceeds about 1100° C. It is desirable to be able to make measurements to a wall with a temperature of about 1600° C.

Since the power of a HeNe-laser is concentrated within a bandwidth of about 0.02 Å, it is quite evident that a substantial improvement of the signal-to-noise ratio could be attained if a filter with a still more narrow bandwidth were provided. Filters of this kind are available, i.e. the so-called Fabry-Perot filters. However, these filters are periodic in nature, i.e. they have what is called a free spectral range (FSR), which is determined by the width of the parallel gap between the reflecting surfaces. Every transmission band has a width determined by the FSR and the quality of the optical surfaces etc., the so-called finesse factor F. The half-width is FSR/F, F normally being approximately 50, but in a good quality filter F could be less.

By making the filter 22 an interference filter having a relatively wide bandwidth (about 2 nm) and adding a narrow bandwidth Fabry-Perot filter 25 in line with an interference filter 22, wherein the central wave-length of the Fabry-Perot filter 25 is tunable by means of the piezoelectrical effect, the overall bandwidth can be reduced to a few hundredths nm. This is because the interference filter 22 and the Fabry-Perot filter 25 are chosen so that the narrow central passband of the Fabry-Perot filter lies within the passband of the interference filter and the sidebands of the Fabry-Perot filter lie outside the passband of the interference filter. It is therefore possible to improve the signal-to-noise ratio and/or to make measurements at higher temperatures than is possible with only the interference filter mentioned before. The Fabry-Perot filter 25 is temperature compensated by the piezoelectrical element 26 in a manner which is well known.

When calculating a Fabry-Perot filter one must take the bandwidth of the interference filter into consideration. If the bandwidth is 20 Å, then the free spectral range of the Fabry-Perot filter has to be more than 20 Å. The transmission bands lying on each side of the central transmission band of the Fabry-Perot filter will then have a mutual distance of more than 40 Å, so that they will be far outside the passband of the interference filter. If the finesse factor is 50 the half-width of the filter combination is about 0.4 Å, which causes an improvement of the signal-to-noise ratio of about 50 times.

An example of the type of Fabry-Perot filter which may be utilized is the Spectra-Physics 410 All-Purpose Plane Parallel Tunable Interferometer incorporating an oven for frequency stability. However, a Fabry-Perot filter without automatic temperature compensation could be used. In this case the filter would be manually tuned to compensate for the increasing heat from the furnace. This can be done by changing the inclination of the filter to the ray path so as to change the distance between the mirrors of the filter. In some types of Fabry-Perot filters piezoelectric spacers are used. By adding a voltage to the piezoelectric spacers the distance between the mirrors can be changed. A Fabry-Perot filter per se is well known and the following reference is mentioned as an example of literature describing such filters:

"Scanning Spherical-Mirror Interferometers For the Analysis of Laser Mode Structure" published in Spectra-Physics Laser Technical Bulletin Number 6 by Spectra-Physics, Inc. Mountain View, California, in 1968.

In order to calculate the signal-to-noise ratio it is necessary to make certain assumptions about the properties of the furnace surface on which the measuring is to be made. If it is assumed that for a certain material the emission factor of the furnace is constant and thus that Planck's formula can be used to investigate the temperature dependence of the radiation within the small wave-range used, and if it is assumed that the radiation is lambertial, i.e., that the intensity is constant as long as the projection of the surface in the measuring direction is constant, and since the surface illuminated by the laser also has a constant projection, then, if it is assumed that the surface is completely diffusively reflecting, the signal-to-noise ratio is determined by various constants multiplied by the returned radiation received by the receiver divided by the effect which is radiated by the furnace in the direction towards the receiver from the part reproduced in the diaphragm of the receiver. Here it may be mentioned that the diaphragm aperture of the receiver may be of the magnitude of 0.25 mm.

It is further assumed that a helium-neon laser is used, which transmits on the wave-length 632.8 nm. Now the effect radiated from a black radiator may be measured at different temperatures:

| °C. | K | W/m², sr and bandwidth expressed in μ |
|---|---|---|
| 527 | 800 | $10^{-3}$ |
| 727 | 1000 | $3 \cdot 10^{-2}$ |
| 1227 | 1500 | $2 \cdot 10^2$ |
| 1727 | 2000 | $1.5 \cdot 10^4$ | where sr is stereoradians (space angle).

At a temperature of 1200° C. the effect radiated from a black radiator according to the above will be about 150 W/m², sr bandwidth expressed in $\mu$. If the bandwidth of the filter is 2nm=$2 \cdot 10^{-3}$ μm, the distance between the instrument and the furnace about 18 m and the entrance aperture of the instrument optics is $0.06^2 \cdot \pi/4 = 2.8 \cdot 10^{-3}$ m², then the effective space angle will be $2.8 \cdot 10^{-3}/18^2 = 0.87 \cdot 10^{-5}$ sr.

Surface projected on the diaphragm in the receiver (aperture 0.25 mm: f=0.4 m):

$$\frac{\pi}{4}\left(\frac{18}{0.4} \cdot 0.00025\right)^2 = 10^{-4} \, m^2.$$

The effect received from the furnace within the passband will be $\epsilon \cdot 150 \cdot 10^{-4} \cdot 0.87 \cdot 10^{-5} \cdot 2 \cdot 10^{-3} = \epsilon \cdot 2.6 \cdot 10^{-10}$W; $\epsilon < 1$; where $\epsilon$ is the emissivitity of the furnace.

The laser emitted is assumed to be 250 μW. At a modulation-degree of 40% this gives a measuring signal with an effect of 100 μW=$10^{-4}$W. When the furnace surface is completely diffuse the effect is spread over the space angle 2 $\pi$, which causes the signal received in the instrument to be:

$$\eta \cdot 10^{-4} \cdot \frac{0.87}{2} \cdot 10^{-5} W = \eta \cdot 1.4 \cdot 10^{-10} \, W;$$

where $\eta$ is a material factor, defined by the reflection and diffusion properties of the furnace lining.

It has been assumed that the laser is of the HeNe type. Such a laser is from the point of view of wave-length not the most suitable when measuring at high temperatures. A change to lasers having short-wave radiation is, however, difficult for the following reasons.

A HeCd laser gives an output power of about 10 mW at a wave-length of 442 nm, which at 1500° C. would give an improvement of the signal-to-noise ratio of more than 100 times, compared with the HeNe laser. However, the HeCd laser is much bulkier and consumes much more power. Furthermore, the life of these lasers is essentially shorter than that of the HeNe laser. Argon lasers might also be used from the point of view of wave-length, but they also have the drawbacks of the HeCd lasers.

If the measurement is to be possible inside the furnace without the aid of a reflector, it is necessary that the radiation emitted be focused on a small point of the furnace lining.

Electro-optical distance-measuring instruments are known which are placed on a theodolite. The theodolite is used for determining the direction to the measuring point. However, in this connection it is necessary to compensate for the parallax of such an instrument in order to obtain a greater precision.

The arrangement in FIG. 1 indicates that the emitter part and the receiver part are placed side by side. However, it is more suitable from the point of view of parallax that the radiation is emitted and received coaxially.

The electro-optical distance measuring instrument which also permits measurement of horizontal and vertical directions, is placed in front of the furnace in which the measurements shall be made. The furnace must be empty of steel, but need not be cooled. The furnace is tilted so that the opening is turned towards the instrument.

One or more points 4 on the inner wall of the furnace can be measured. The measuring valves are transmitted to an electronic computer which with the help of data regarding the horizontal and vertical direction, the distance to the points 4 and in some cases data regarding one or more reference points, can define the location of the points and the thickness of the lining in these points. This is done in the manner shown in application Ser.

No. 635,082, filed Nov. 25, 1975, entitled "OPTICAL MEASURING METHOD" invented by Karl Ragnar Schöldström, Holger Marcus, Lennart Hordström and Nils Ståhl, and assigned to the assignee of the present invention.

The next measurement is made when the furnace has been in use for a time. It is hereby desirable to measure the same points 4 as above.

From the data of the two measurements it is possible to determine the change in thickness of the lining.

The characteristic features of the invention provide the conditions necessary for the distance measurement to be performed with the high precision and safety required. Although the self-radiation of the furnace is strong, the measurements may be carried out with great accuracy by means of an instrument according to the invention.

Although this invention has been described with respect to its preferred embodiment, it should be understood that many variations and modifications will now be obvious to those skilled in the art, and it is preferred, therefore, that the scope of the invention be limited, not by the specific disclosure herein but only by the appended claims.

What is claimed:

1. A method for measuring the change in thickness between a first time and a second time of the lining on the inner wall of a furnace having a temperature of at least 500° C., said method comprising the steps of:
   providing an electro-optical distance measuring instrument having the capability of transmitting a modulating radiation signal within a narrow frequency band, receiving the reflected transmitted signal, and determining by phase comparison methods the distance from the electro-optical measuring instrument to the point of reflection;
   providing an optical filter aligned only in the receiving path of said electro-optical distance measuring instrument to filter out all radiation other than said narrow frequency band of transmitted radiation, said optical filter comprising the combination of an interference filter and a Fabry-Perot filter wherein the central pass band of the Fabry-Perot filter lies within the pass band of the interference filter and the side bands of the Fabry-Perot filter lie outside the pass band of the interference filter;
   performing at the first time a first measurement of the distance from the electro-optical distance measuring instrument to a first point on the lining on the inner wall of the furnace, said first measurement being performed by:
      (i) focusing said modulated radiation signal of said electro-optical distance measuring instrument on said first point on the inner lining of the furnace;
      (ii) receiving the reflected transmitted signal from said first point through said optical filter; and
      (iii) determining by phase comparison methods the distance from the electro-optical distance measuring instrument to said first point on the inner wall of said furnace;
   determining the distance from said first point to a reference point fixed in relation to said furnace;
   performing at the second time a second measurement of the distance from the electro-optical distance measuring instrument to a second point on the lining on the inner wall of the furnace, said second point being in the vicinity of said first point, and said second measurement being performed by:
      (i) focusing said modulated radiation signal on said second point on the inner wall of said furnace;
      (ii) receiving the reflected transmitted signal from said second point through the optical filter; and
      (iii) determining by phase comparison methods the distance from the electro-optical distance measurement instrument to said second point;
   determining the distance from said second point to said reference point; and
   comparing said distance from said first point to said reference point with said distance from said second point to said reference point, and determining therefrom the change in thickness of said lining.

* * * * *

UNITED STATES PATENT AND TRADEMARK OFFICE
CERTIFICATE OF CORRECTION

PATENT NO. : 4,227,802

DATED : October 14, 1980

INVENTOR(S) : Ragnar Scholdstrom; Holger Marcus and Lennart Nordstrom

It is certified that error appears in the above-identified patent and that said Letters Patent are hereby corrected as shown below:

Column 4, line 15, "2 1 nm" should read --2 mm--.

Column 6, line 12, after "laser" insert --effect--.

Signed and Sealed this

Thirteenth Day of January 1981

[SEAL]

Attest:

Attesting Officer

SIDNEY A. DIAMOND

Commissioner of Patents and Trademark